United States Patent
Glime, III et al.

(10) Patent No.: US 10,690,259 B2
(45) Date of Patent: Jun. 23, 2020

(54) MANUALLY ACTUATED VALVE WITH OVER-TRAVEL FEATURE

(71) Applicant: Swagelok Company, Solon, OH (US)

(72) Inventors: William H Glime, III, Chagrin Falls, OH (US); Branden W. Keeper, Mentor, OH (US)

(73) Assignee: Swagelok Company, Solon, OH (US)

( * ) Notice: Subject to any disclaimer, the term of this patent is extended or adjusted under 35 U.S.C. 154(b) by 0 days.

(21) Appl. No.: 16/581,830

(22) Filed: Sep. 25, 2019

(65) Prior Publication Data

US 2020/0056720 A1 Feb. 20, 2020

Related U.S. Application Data

(63) Continuation of application No. 13/785,592, filed on Mar. 5, 2013, now abandoned.
(Continued)

(51) Int. Cl.
*F16K 31/50* (2006.01)
*F16K 31/524* (2006.01)
(Continued)

(52) U.S. Cl.
CPC ............. *F16K 31/506* (2013.01); *F16K 1/04* (2013.01); *F16K 7/14* (2013.01); *F16K 7/16* (2013.01);
(Continued)

(58) Field of Classification Search
CPC ............. F16K 31/506; F16K 31/52408; F16K 31/143; F16K 31/50; F16K 7/14;
(Continued)

(56) References Cited

U.S. PATENT DOCUMENTS

| 154,271 A | 8/1874 | Murdock |
| 301,367 A | 7/1884 | Hoag |
| (Continued) | | |

FOREIGN PATENT DOCUMENTS

| CN | 1297518 | ‡ | 5/2001 |
| EP | 1302712 | | 4/2003 |
| (Continued) | | | |

OTHER PUBLICATIONS

Office action from Chinese Application No. 201380054030.4 dated Jun. 1, 2016.‡

(Continued)

*Primary Examiner* — Craig J Price
*Assistant Examiner* — Andrew J Rost
(74) *Attorney, Agent, or Firm* — Calfee, Halter & Griswold LLP (57) ABSTRACT

A manually actuated valve assembly includes a valve body defining a flow passage, a valve member assembled with the valve body, an actuator housing assembled with the valve body, an actuator stem having an upper stem portion coupled with a lower stem portion by a coupling, a rotatable actuator drive member coupled to said upper stem portion, and a biasing spring disposed in the actuator housing. The actuator drive member is rotatable between a first stop position corresponding to a fully open valve position, and a second stop position corresponding to a fully closed valve position. The coupling between the upper stem portion and the lower stem portion is configured to provide an over-travel condition between the actuator drive member and said actuator stem configured to provide a closed valve condition at a predetermined rotational position of the actuator drive member that is offset from the second stop position.

15 Claims, 10 Drawing Sheets

Related U.S. Application Data (60) Provisional application No. 61/714,831, filed on Oct. 17, 2012.

(51) Int. Cl.
*F16K 7/14* (2006.01)
*F16K 35/02* (2006.01)
*F16K 7/16* (2006.01)
*F16K 1/04* (2006.01)
*F16K 31/143* (2006.01)

(52) U.S. Cl.
CPC ............ *F16K 31/143* (2013.01); *F16K 31/50* (2013.01); *F16K 31/52408* (2013.01); *F16K 35/022* (2013.01)

(58) Field of Classification Search
CPC . F16K 7/16; F16K 1/04; F16K 35/022; F16K 35/025; F16H 25/12; F16H 25/2021
USPC .................... 251/100, 95; 137/377
See application file for complete search history.

(56) References Cited

U.S. PATENT DOCUMENTS

| | | | |
|---|---|---|---|
| 791,173 A | 5/1905 | Anglim | |
| 941,934 A | 11/1909 | Marsh | |
| 2,216,292 A ‡ | 10/1940 | Evleth | F16K 7/16 251/26 |
| 2,688,227 A ‡ | 9/1954 | Geyer | B64C 25/22 60/709 |
| 3,195,574 A ‡ | 7/1965 | Carls | F15B 13/04 137/62 |
| 3,683,954 A ‡ | 8/1972 | Press | F16K 43/008 137/26 |
| 3,842,854 A ‡ | 10/1974 | Wicke | F16K 17/383 137/77 |
| 3,877,677 A ‡ | 4/1975 | Daghe et al. | F16K 1/221 251/22 |
| 3,941,230 A ‡ | 3/1976 | Bellino et al. | B41J 19/202 400/32 |
| 4,196,896 A ‡ | 4/1980 | Burns | B23Q 3/108 269/20 |
| 4,706,929 A ‡ | 11/1987 | Kalaskie et al. | F16K 1/305 137/31 |
| 5,000,215 A ‡ | 3/1991 | Phillips | F16K 1/385 137/15 |
| 5,004,011 A ‡ | 4/1991 | Linder et al. | F16K 1/523 137/55 |
| 5,106,055 A ‡ | 4/1992 | Phillips | F16K 31/50 137/61 |
| 5,172,887 A ‡ | 12/1992 | Cross et al. | F16K 31/0668 251/12 |
| 5,289,974 A ‡ | 3/1994 | Grime et al. | B05B 15/00 239/72 |
| 5,439,197 A ‡ | 8/1995 | Itoi | F16K 31/506 251/104 |
| 5,722,304 A ‡ | 3/1998 | Allen | F16H 25/20 254/10 |
| 6,027,098 A ‡ | 2/2000 | Nevrekar | F16K 3/04 251/16 |
| 6,029,692 A ‡ | 2/2000 | Barber | F16K 31/602 137/270 |
| 6,186,763 B1 ‡ | 2/2001 | Scanlan | B29C 45/1775 425/19 |
| 6,561,480 B1 ‡ | 5/2003 | Komiya | F16K 1/38 251/122 |
| 6,880,424 B2 ‡ | 4/2005 | McMillen | F16C 1/16 74/500 |
| 6,929,188 B2 ‡ | 8/2005 | Taylor et al. | G05D 23/1313 236/12 |
| 6,981,689 B2 ‡ | 1/2006 | Mihaylov et al. | F16K 47/12 137/55 |
| 7,007,568 B2 ‡ | 3/2006 | MacAulay et al. | F16H 25/20 297/28 |
| 7,070,159 B2 ‡ | 7/2006 | Kajitani | F16K 31/047 251/14 |
| 7,338,124 B2 ‡ | 3/2008 | McMillen | B60N 2/0232 297/28 |
| 7,509,972 B2 ‡ | 3/2009 | Nesbitt | F16K 35/06 137/383 |
| 7,578,496 B2 ‡ | 8/2009 | Heelan et al. | F16K 31/506 251/26 |
| 7,938,035 B2 ‡ | 5/2011 | Mueller | F16H 61/32 74/473 |
| 8,037,869 B2 ‡ | 10/2011 | Ricco et al. | F02M 47/027 123/47 |
| 8,191,860 B2 ‡ | 6/2012 | Eschborn et al. | F16K 31/043 215/12 |
| 8,201,467 B2 ‡ | 6/2012 | Johnson et al. | F16H 25/20 310/80 |
| 8,356,477 B2 ‡ | 1/2013 | Schlipf et al. | F15B 15/088 60/403 |
| 2003/0029684 A1 ‡ | 2/2003 | Forster | F16F 9/3214 188/28 |
| 2005/0045839 A1 ‡ | 3/2005 | Kajitani | F16K 31/047 251/14 |
| 2009/0039304 A1 ‡ | 2/2009 | Ishihara | F16K 35/027 251/264 |
| 2011/0120243 A1 ‡ | 5/2011 | Pettersson | A47B 9/04 74/89 |
| 2011/0308655 A1 ‡ | 12/2011 | Keeper et al. | F16K 7/16 138/89 |
| 2012/0211685 A1 ‡ | 8/2012 | Wang | F15B 15/12 251/12 |
| 2013/0037622 A1 ‡ | 2/2013 | Kim et al. | F02M 43/04 239/5 |
| 2014/0103240 A1 | 4/2014 | Glime | |

FOREIGN PATENT DOCUMENTS

| | | | |
|---|---|---|---|
| EP | 2301382 | 3/2011 | |
| GB | 865565 | 4/1961 | |
| GB | 913976 | 12/1962 | |
| GB | 914439 | 1/1963 | |
| JP | 60-12779 | ‡ 1/1985 | ............ B42D 5/003 |
| JP | H0783338 | ‡ 3/1995 | |
| JP | 2000-018413 | ‡ 1/2000 | |
| WO | 91/00465 | 1/1991 | |
| WO | 97/17641 | 5/1997 | |

OTHER PUBLICATIONS

Decision of the Rejection from Chinese Application No. 2018032900817030 dated Apr. 3, 2018.‡
Office action from Japanese Application No. 2015-5337753 dated Sep. 27, 2017.‡
Office action from Chinese Application No. 201380054030.4 dated Feb. 22, 2017.‡
Examination Report from Singapore Application Serial No. 11201502508V dated Jul. 4, 2016.‡
Office action from Chinese Application No. 201380054030.4 dated Jul. 10, 2017.‡
International Search Report and Written Opinion from PCT/US13/64755 dated Mar. 7, 2014.

‡ imported from a related application

MANUALLY ACTUATED VALVE WITH OVER-TRAVEL FEATURE

CROSS-REFERENCE TO RELATED APPLICATIONS

This application is a continuation of U.S. Non-Provisional Patent Application Ser. No. 13/785,592 filed on Mar. 5, 2013 for ACTUATOR WITH DUAL DRIVE, which claims the benefit of U.S. Provisional Patent Application Ser. No. 61/714,831 filed on Oct. 17, 2012 for ACTUATOR WITH OVER-TRAVEL, the entire disclosure of which is fully incorporated herein by reference.

BACKGROUND OF THE DISCLOSURE

The inventions relate to actuators for flow control valves and other devices. The inventions more particularly relate to manually operated actuators and also hybrid actuators that may be manually operated and/or pneumatically operated.

Actuators may be used for many different functions and operations. One example is to open and close a valve or other flow control device. Actuators may operate in many different ways. One example is a manually operated actuator in which an actuator drive member, for example a handle, can be manually moved between two positions. Other actuators may be pneumatically operated thereby allowing automatic, remote, or electronic control of the actuator operation.

DESCRIPTION OF EXEMPLARY EMBODIMENTS

By way of introduction, this disclosure presents a number of embodiments that illustrate several inventive concepts relating to an actuator. One inventive concept is embodied in a manually operated actuator that has a dual drive structure for the actuator stem. The dual drive structure provides increased stroke of the actuator stem without increasing actuation torque needed to reach a closed position.

Another inventive concept may be embodied in a manually operated actuator that has a dual drive structure for an actuator stem that applies a first force to the actuator stem using an indirect drive, for example with a biasing member, and applies a second force to the actuator stem using a direct drive between an actuator drive member and the actuator stem, for example with a threaded connection.

Another inventive concept may be embodied in a manually operated actuator that has a dual drive structure for an actuator stem wherein the actuator stem includes a first portion and a second portion, and a coupling between the first portion and the second portion. In one embodiment the coupling may be realized in the form of a threaded coupling having a controlled or designed-in thread backlash.

Another inventive concept may be embodied in an actuator that is used to control operation of a flow control device such as, for example, a valve. In one embodiment, a dual drive structure for an actuator stem is provided. In another embodiment, the dual drive structure includes an actuator stem having a coupling that provides axial over-travel.

Another inventive concept may be embodied in an actuator that is used to control operation of a flow control device such as, for example, a valve. In one embodiment, the actuator may include an over-travel mechanism that provides, for example, axial over-travel of the actuator relative to the open or closed state of the valve or both. In a more particular embodiment, the over-travel mechanism may include a controlled or designed-in thread backlash to provide the over-travel. In another embodiment, the over-travel mechanism may include a biasing member that provides the over-travel, alternatively with or without including a coupling having a controlled or designed-in thread backlash.

Another inventive concept may be embodied in a hybrid actuator that is used to control operation of a flow control device such as, for example, a valve. In one embodiment, the hybrid actuator may include a pneumatically operated actuator stem that incorporates a manual override that disables and enables the pneumatic actuator. In another embodiment, the manual actuator portion of the hybrid actuator may be realized using any of the above inventive concepts and embodiments.

Additional alternative and optional embodiments of structure, features and operation of these inventive concepts and embodiments are presented hereinbelow. The inventions may also be used for applications for controlling a valve and actuator using other configurations than the embodiments described herein, and valve and actuator designs other than the exemplary designs shown herein. The inventions may also find application and use with devices other than valves and flow control devices.

Figure 1:
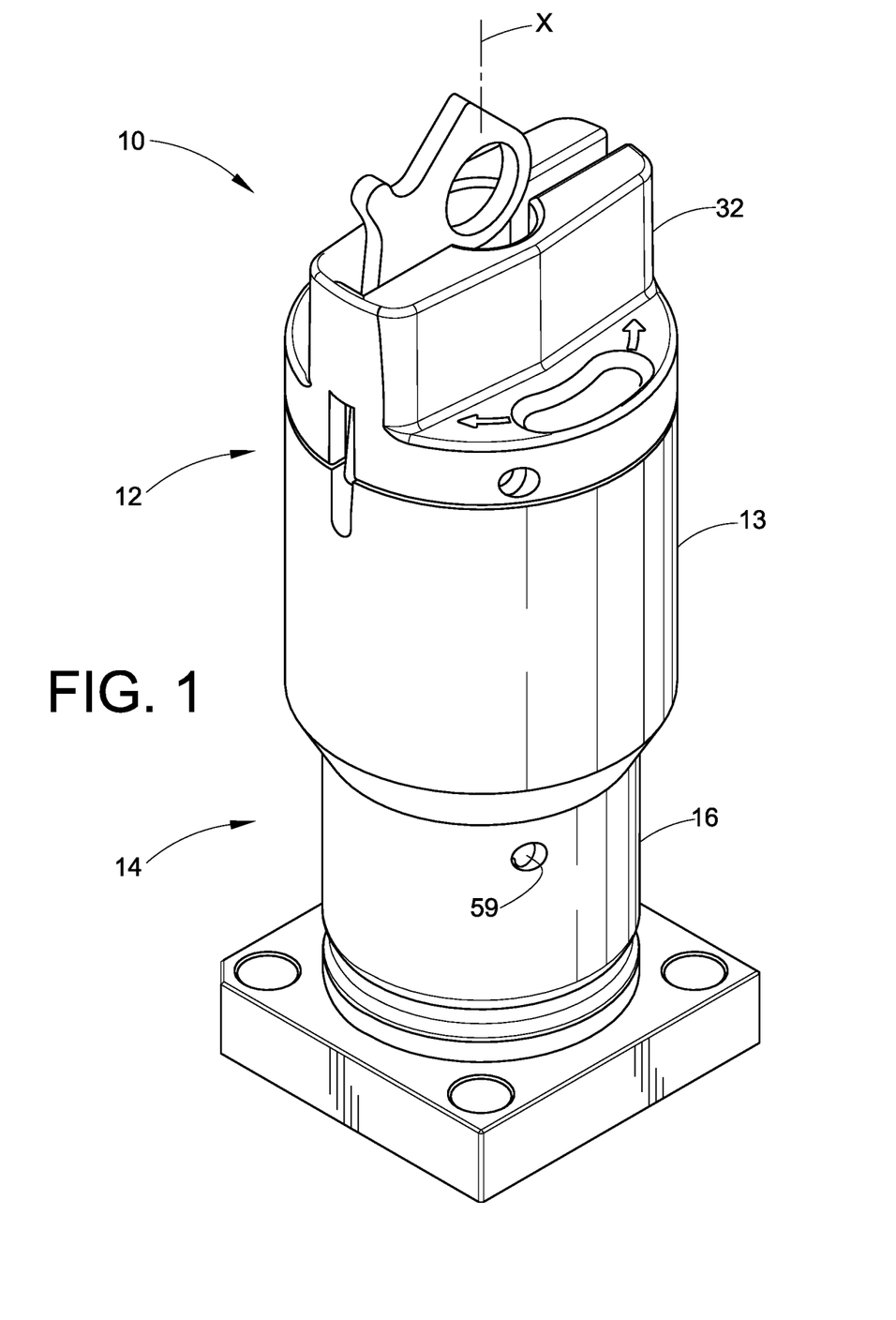
FIG. 1 illustrates an isometric view of an embodiment of manually operated actuator and valve assembly and in a fully closed position.
Figure 2:
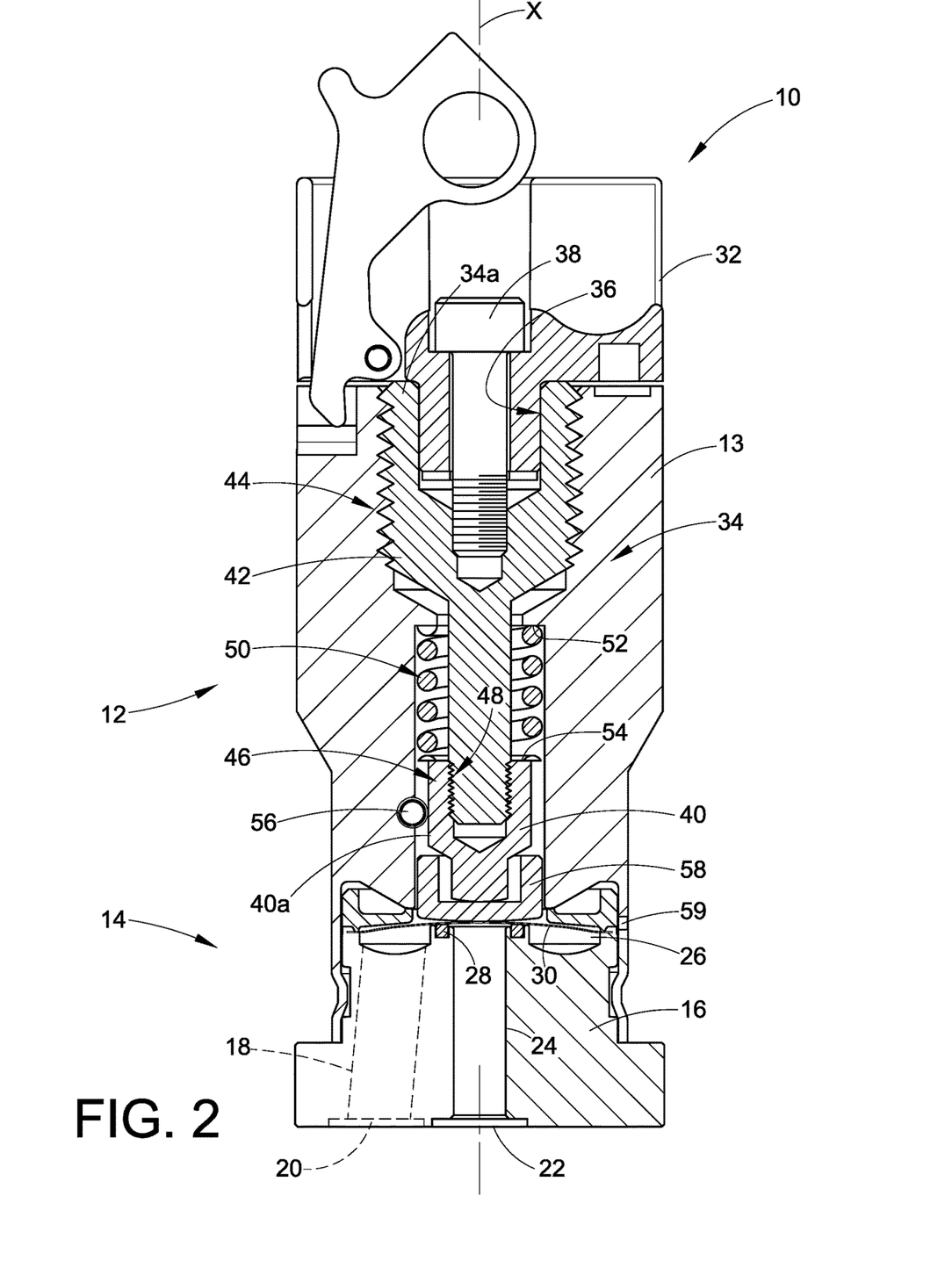
FIG. 2 is the actuator and valve assembly of FIG. 1 in longitudinal cross-section.
Figure 3:
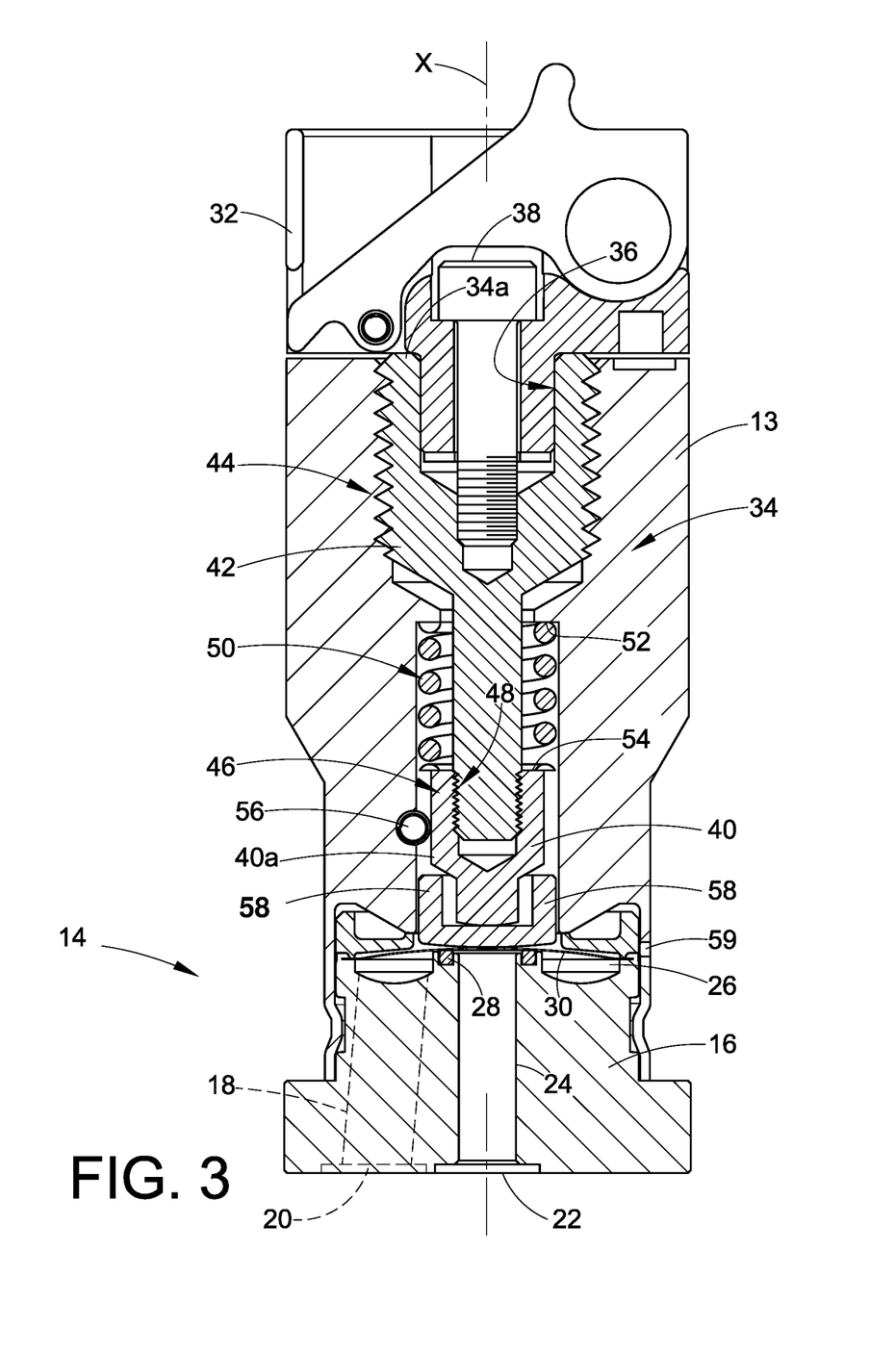
FIG. 3 is the actuator and valve assembly of FIG. 1 in longitudinal cross-section and in a fully open position.

With reference to FIGS. 1-3, an actuator and valve assembly 10 may include an actuator assembly 12 and a flow control device such as, for example, a valve assembly 14. The actuator assembly may be realized in the form of a manually operated actuator. The valve assembly 14 may have many different configurations and uses. The valve assembly 14 may be realized in the form of a diaphragm valve having a valve body 16 that has two or more flow passages therein so as to control the flow of fluid, for example a liquid or gas, from one port to another. In the view of FIGS. 1 and 2, an inlet flow passage 18 (which is hidden in the orientation of FIG. 2) opens to an inlet port 20. An outlet port 22 opens to an outlet flow passage 24. Both the inlet flow passage 18 and the outlet flow passage 24 communicate with a valve cavity 26. The valve cavity 26 opens to the outlet flow passage 18 through an annular valve seat 28. A valve member 30, for example a diaphragm 30, seals the valve cavity 26 from the actuator assembly 12. The diaphragm 30 is moved toward and into contact with the valve seat 28 to close the valve (FIG. 2) and is moved away from the valve seat 28 to open the valve (FIG. 3). The diaphragm 30 movement is effected by operation of the actuator assembly 12.

Operation of a diaphragm valve as described is well known and need not be further described herein to understand and practice the inventions, nor does the flow control device need to be a diaphragm valve for it should be noted that many other types of valves may be used other than a diaphragm valve, for example, a bellows valve or plug type shutoff valve to name just two examples. The valve assembly 14 may alternatively include additional ports and flow passages, for example, a three way valve, and flow may alternatively be bi-directional. The valve assembly 14 configuration as illustrated is what is known in the art as a surface mount configuration, meaning that the inlet and outlet ports 20, 22 are coplanar and the valve assembly is mounted to a support surface such as a substrate of a gas stick. But this is but one configuration, and the inventions may be used with flow control devices that are connected in a fluid circuit in many different ways, including but not limited to customary inlet and outlet end connections, all of which are well known to those skilled in the art.

The actuator assembly 12 may include an actuator housing 13 that receives an actuator drive member 32. Because this is a manually operated actuator, the actuator drive member 32 may be realized in the form of a handle 32 that can be manually operated. However, a tool could optionally be used manually to operate the handle 32. The handle 32 is coupled to an actuator stem 34 by any convenient technique so that actuation of the handle 32 causes linear movement of the actuator stem 34 along a longitudinal axis X. For example, we show a spline connection 36 between the handle 32 and an upper end 34a of the actuator stem 34, but alternative connections may be used. A bolt 38 may be used to secure the handle 32 with the actuator stem 34. The handle 32 therefore is adapted to be manually rotated about the longitudinal axis X.

The actuator stem 34 may be realized in the form of a two piece actuator stem 34. For example, there may be a first or lower portion 40 of the actuator stem 34 and a second or upper portion 42 of the actuator stem 34. A first threaded connection 44 is provided between an outer threaded portion of the second or upper portion 42 of the actuator stem 34 and an inner threaded portion of the actuator housing 13. A coupling 46 joins the first portion 40 of the actuator stem 34 and the second portion 42 of the actuator stem 34. The coupling 46 may be realized, for example, in the form of a second threaded connection 48.

A biasing member 50 is disposed between a shoulder 52 of the actuator housing 13 and a surface 54 of the first portion 40 of the actuator stem 34. The biasing member 50 may be realized in many different ways, in this example, the biasing member 50 is realized in the form of a coiled spring. The biasing member 50 is compressed in position so that the biasing member 50 urges the first portion 40 of the actuator stem 34 downward (as viewed in the figures) or in other words towards the diaphragm 30.

An anti-rotation device 56 may be provided that prevents the lower portion 40 of the actuator stem 34 from rotating about the X axis, for reasons that will be described below. The anti-rotation device 56 allows for axial translation of the lower portion 40. The anti-rotation device 56 may be a pin that engages a flat exterior surface 40a of the lower portion 40 of the actuator stem 34. Many other techniques may be alternatively used to prevent rotation of the actuator stem first portion 40.

An optional vent passage 59 may be provided between the valve chamber 56 and the ambient environment. This vent allows process fluid to exit the valve assembly in the event of a breach of the diaphragm seal so that the process fluid does not enter the actuator assembly.

The lower portion 40 of the actuator stem 34 may contact a button 58 that in turn contacts an upper non-wetted surface of the diaphragm 30. In this manner, axial translation of the actuator stem 34 along with the action of biasing member 50 operates to open and close the valve by moving the diaphragm 30 away from and towards the valve seat 28.

For many manually operated flow control devices, for example, a diaphragm valve as illustrated herein, the stroke of the actuator stem that can be effected by the actuator assembly is important so that the valve can fully open to achieve maximum flow. But for a given actuator size that uses direct drive between the actuator drive member and the actuator stem, increasing the actuator stroke for a given amount of handle rotation also increases the actuation torque. By direct drive we mean axial translation of movement of the actuator stem 34 caused by operation of the actuator drive member 32. For example, rotation of the handle 32 applies a force on the actuator stem which directly causes axial movement of the actuator stem 34 to open and close the valve. The torque increases because in order to increase stroke of the actuator stem for a defined degree of handle rotation in a direct drive actuator, the thread pitch or other mechanical means of translating rotational motion into linear travel must be adjusted to provide more travel per degree of rotation, which increases torque when the forces that the linear travel is acting upon are similar. It is noted that the actuator and valve assembly 10 in this embodiment is a quarter turn valve, meaning that the handle 32 only turns through ninety degrees from fully open to fully closed positions of the valve.

We compensate for this torque versus stroke relationship by incorporating an actuator assembly 12 that uses a dual drive concept. The dual drive concept may be embodied using two drive elements or portions that are coupled together but that become operably disengaged with respect to each other at an applied load, for example, an applied load that is defined or set by a biasing member. By operably disengaged we are referring to disengagement of the functional coupling or operation by which the dual drive first portion and second portion provide axial displacement relative to rotation of an actuator drive member. The dual drive concept may be realized, for example, with the use of a dual drive coupling for the actuator drive member 32 and the actuator stem 34. As noted above, the actuator stem 34 has a first portion 40 and a second portion 42 that are coupled together with the coupling 46. An embodiment of a dual drive coupling for the actuator drive member 32 and the actuator stem 34 may be realized with the first threaded connection 44 and the second threaded connection 48. More particularly, we provide the first threaded connection 44 with a first thread orientation, for example a right hand thread, and the second threaded connection 48 with an opposite thread orientation, for example a left hand thread. Alternatively, the first threaded connection 44 may have a left hand thread orientation, and the second threaded connection 48 may have a right hand thread orientation.

Assume that the actuator assembly 12 is in the fully up position as in FIG. 1 which corresponds to the valve being fully open. When the actuator drive member or handle 32 is rotated clockwise, the actuator stem upper portion 42 moves downward by operation of the first threaded connection 44. Because the lower portion 40 is coupled to the upper portion 42 using an opposite hand thread orientation, and further because the lower portion 40 is prevented from rotating by the anti-rotation device 56, the lower portion 40 also moves or strokes downward towards the diaphragm. The total stroke of the actuator stem 34 is the combined stroke of the upper portion 42 and the lower portion 40 of the actuator stem 34. This is the case until the diaphragm 30 contacts the valve seat 28. At that point, the valve is closed and the lower portion 40 of the actuator stem 34 can no longer move axially (disregarding some slight movement due to compression of the valve seat 28).

After the diaphragm 30 makes contact with the valve seat 28, the total stroke of the actuator stem 34 is basically equal to the stroke of the upper portion 42 of the actuator stem 34. We thus achieve an increase in overall stroke of the actuator between the open and closed positions of the valve member 30 without increasing thread pitch. Note that although the thread pitch has not been increased, the handle torque needed to advance the stem against a given load is similar to that of a single drive member having a thread pitch that provides a comparable linear displacement or stroke per degree rotation as compared to the combined or coupled dual drive portions. Viewed another way, we have increased overall stroke without increasing thread pitch, with the handle torque that is needed to close the valve being the same as in a direct drive actuator. In essence, we duplicate the effect of an increased thread pitch using a single threaded drive mechanism by using multiple threaded mechanisms with lower thread pitch members operating in series. It is only during the portion of actuation where the application of high closing force against the valve seat is desired that we design the actuator so that the lower portion disengages from the upper portion to enable direct drive of the handle to close the valve.

In some applications, it may be desirable to provide an over-travel feature for the actuator and valve assembly 10. By over-travel we mean that the valve member 30 engages the valve seat 28 to close the valve before the full closing rotation of the actuator drive member 32 is completed. This we refer to as closing over-travel. Likewise, in some applications, it may be desirable that the valve member 30 unseat from the valve seat 28 and allow the valve to open fully before the full opening rotation of the actuator drive member 32 is completed. This we refer to as opening over-travel. This can be thought of as follows. The actuator 12 will have a first position of the actuator drive member 32 that is at a first maximum position that corresponds to a valve open condition. For example, in the case of a rotary actuator drive mechanism such as the handle 32 embodiment of FIGS. 2 and 3, the handle 32 would be turned fully counterclockwise to a first or fully open stop position which we will reference as the 0° position (assuming a right hand thread orientation for the first threaded connection 44). The actuator 12 will also have a second position of the actuator drive member 32 that is at a second maximum position that corresponds to a valve closed condition. For example, in the case of a rotary actuator drive mechanism such as the handle 32 embodiment, the handle 32 would be turned fully clockwise to a second or fully closed stop position which will be the 90° position for a quarter turn actuator and valve assembly 10. An opening over-travel feature means that the valve member 30 releases from the valve seat 28 and allows the valve to be open to its preferably full flow capacity before the actuator drive member 32 reaches the 0° position. A closing over-travel feature means that the valve member 30 contacts the valve seat 28 to block fluid flow through the valve before the actuator drive member 32 reaches the 90° position.

As an example, a 20° over-travel for both opening and closing positions of the actuator drive member 32 would mean that the valve member 30 engages the valve seat 28 to close the valve (although perhaps not seated with maximum closing force) when the actuator drive member 32 has been rotated to a third position or the 70° position, and that the valve member 30 releases or disengages from the valve seat 28 to open the valve (though not fully opened) when the actuator drive member 32 has been rotated to a position between the 70° position and the 20° position. At and below the 20° rotation position the valve is fully open, for example. Alternatively, the function achieved at these positions may be reversed if so desired. For example, the actuator assembly 12 can easily be adapted so that the valve member 30 engages the valve seat 28 to close the valve (although perhaps not seated with maximum closing force) when the actuator drive member 32 has been rotated to a fourth position or the 20° position, and that the valve member 30 releases or disengages from the valve seat 28 to open fully the valve when the actuator drive member 32 has been rotated to the 70° position, whereat the fully open manual handle stop position being the 90° position and the fully closed manual handle stop position being the 0° position. Moreover, the various degrees of rotation in these examples are exemplary and not restrictive. For example, the over-travel feature can be set at any desired angle of rotation by adjustment of the structure used to achieve over-travel, such as the exemplary structures described below or others. Note that for each of the four positions described above, there is a corresponding axial position of the actuator stem 34.

Figure 3A:
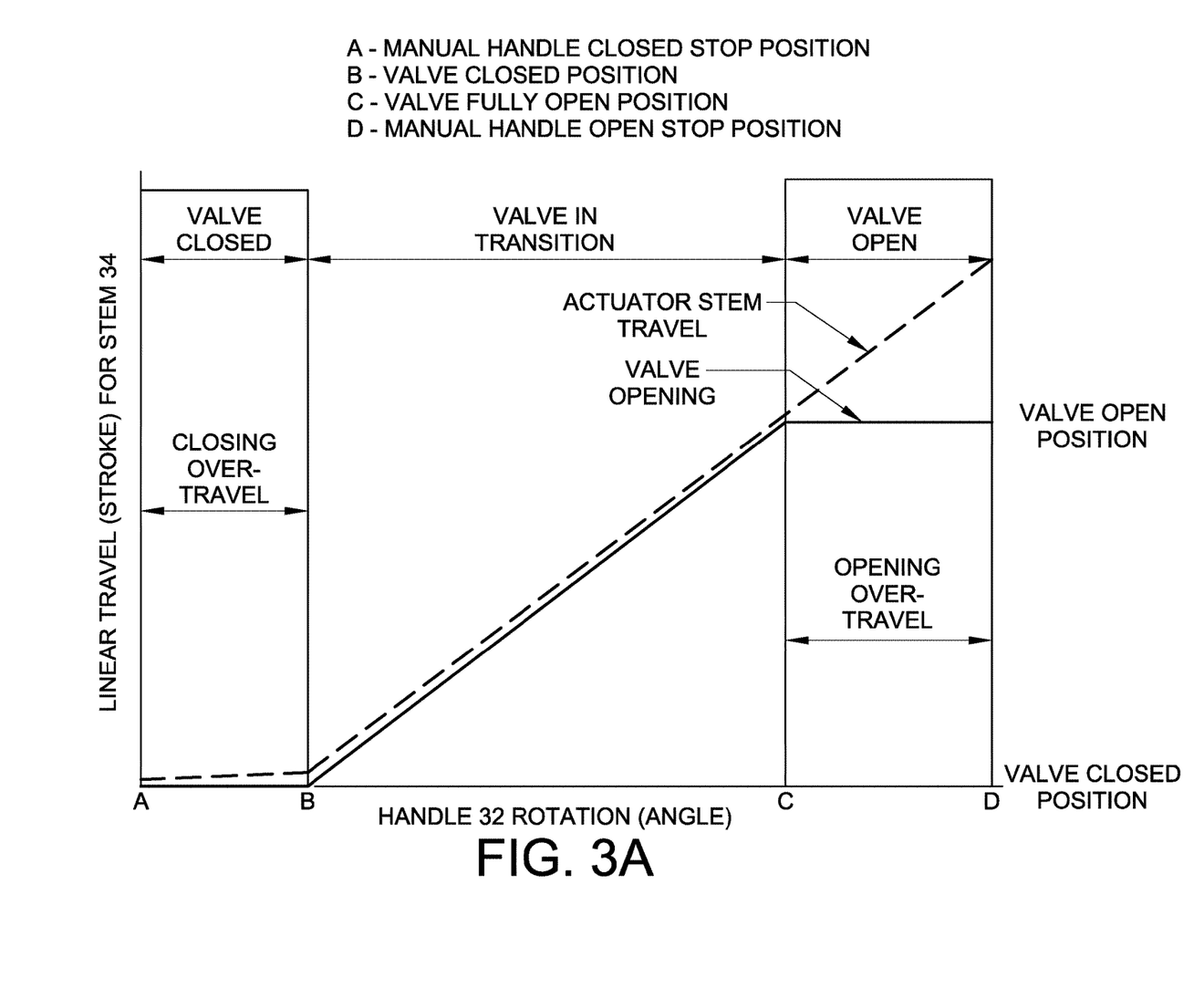
FIG. 3A is an exemplary plot of an over-travel concept that may be realized with the teachings herein.

FIG. 3A illustrates an example of the over-travel concept that may be realized using the teachings herein. This plot shows linear travel or stroke of an actuator stem 34 in relation to rotation angle of the actuator drive member 32 such as the handle 32 (note that as the handle 32 is rotated from A through to D the handle rotation is counterclockwise as would be conventional for a manual valve, but such is not required and alternatively may be clockwise rotation as will be appreciated by those skilled in the art). The dashed line illustrates the actuator stem 34 travel and the solid line represents the valve member 30 open/close status. For a quarter turn actuator, for example, A may represent the full 90° handle clockwise rotation or in other words the handle is at the fully closed stop position. D then may represent the full 0° handle counterclockwise rotation, or in other words the handle is at the fully open stop position. But conceptually, the letters A, B, C and D relate to any angle desired by the actuator designer for a particular application.

For the 20° over-travel example we disclose above, B may represent the 20° handle rotation position (as referenced in this example from the handle fully clockwise rotation closed position A). Between A and B the valve member 30 contacts the valve seat 28 and the valve is closed. The dashed line between A and B may have a small slope (exaggerated for clarity in FIG. 3A) because of possible small axial movement of the actuator stem as the valve seat compresses (as noted hereinabove). C may represent the 70° handle counterclockwise rotation position (as referenced in this example from the handle fully closed position A). Between C and D then, the valve member is not in contact with the valve seat 28 and the valve is open to flow. Whether the valve member 28 provides full flow at position C may be a design selection. Between B and C the valve member 30 is in the transition region as it moves further towards it maximum distance from the valve seat 28.

The dual drive concept of our actuator may be used beneficially to also facilitate implementing over-travel, either for opening over-travel, closing over-travel or both, when over-travel is optionally to be included in an actuator and valve assembly. In one embodiment, we provide a predetermined or controlled thread backlash in the second threaded connection 48. We note that many threaded connections may exhibit undesired or unintended backlash due to poor tolerance control for example. Such backlash is not necessarily a problem depending on the application of the threaded connection but threaded connections preferably have little backlash if any. But we have discovered that we can achieve over-travel by purposely designing-in a controlled or predetermined thread backlash for the second threaded connection 48 and combining that designed backlash with the biasing member 50. So by controlled or predetermined thread backlash or designed-in thread backlash we mean that we purposely provide a controlled gap within the threaded connection in order to achieve over-travel. This is different, therefore, from a thread backlash that is attributable to less than optimal manufacturing processes or designs or otherwise not controlled or intentionally introduced into a threaded connection.

Figure 4A:
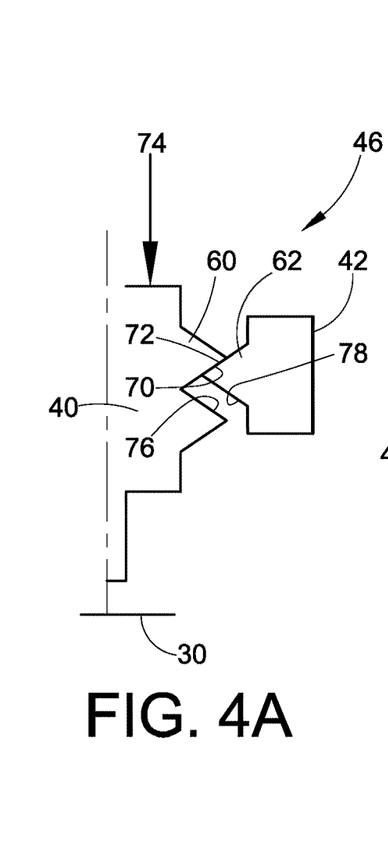
FIGS. 4A-4D illustrate in a simplified schematic manner an embodiment of a coupling having a controlled thread backlash for an over-travel feature of the embodiment of FIG. 1.
Figure 4B:
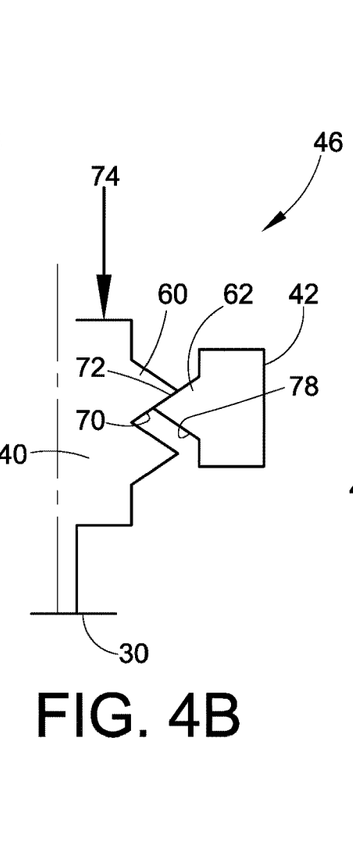
Figure 4C:
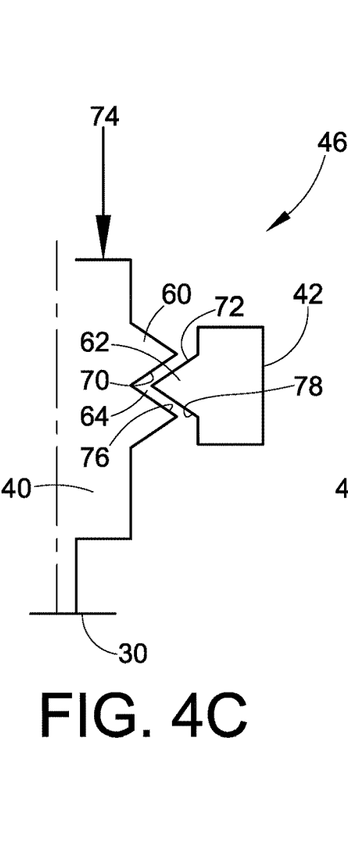
Figure 4D:
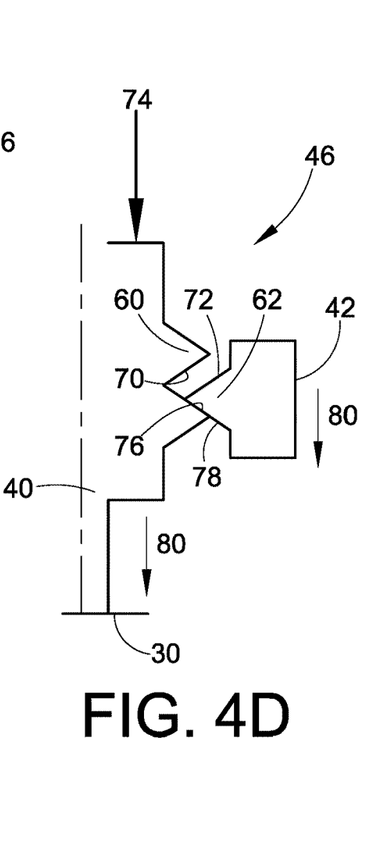

FIGS. 4A-4D schematically illustrate an embodiment of a controlled or designed-in thread backlash to realize, for example, a 20° over-travel in the actuator and valve assembly 10. These figures provide, as an example, an enlarged schematic illustration of the coupling 46 and the associated second threaded connection 48 embodiments. FIG. 4A represents the actuator stem 34 (and for each FIG. 4A-4D the actuator drive member 32) in the 0° or fully open valve position; FIG. 4B represents the actuator stem 34 in the range of 0° to 70° position where at 70° the valve member 30 contacts the valve seat 28 to close the valve; FIG. 4C represents the actuator stem 34 in the transition range of 70° to 90° position where the valve member 30 contacts the valve seat 28 to close the valve; and FIG. 4D represents the actuator stem 34 in the 90° or fully closed valve position.

FIGS. 4A-4D somewhat exaggerate the designed-in thread backlash for clarity. The left side threaded structure represents the lower portion 40 of the actuator stem 34, and the right side threaded structure represents the upper portion 42 of the actuator stem 34. In this exemplary embodiment of a 20° over-travel, the threads 60 of the lower portion 40 mesh with the threads 62 of the upper portion 42, but with a controlled or designed-in gap 64 (see FIG. 4C) between the respective crest portion 66 and root portion 68 of the threads 60, 62. The controlled gap 64 provides a controlled or designed-in controlled backlash for the second threaded connection 48 in the coupling 46.

With reference also to FIG. 2, recall that a biasing member 50, such as a spring, applies a downward first force (74) on the valve member 30 through the lower portion 40 of the actuator stem 34. With the controlled gap 64, a lower surface 70 of each thread 60 of the lower portion 40 of the actuator stem 34 contacts or slides along an upper surface 72 of each thread 62 of the upper portion 42 of the actuator stem 34. Because the biasing member 50 is applying a first motive force 74 on the lower portion 40, as the actuator drive member 32 is turned clockwise from 0° to 70° the non-rotating lower portion of the actuator stem moves axially towards the valve member 30 due to the thread engagement. Because the first motive force 74 is exclusively attributable to the biasing member 50 and not the actuator drive member 32, we refer to this movement as an indirect drive of the lower portion 40 of the actuator stem 34. At the 70° position for the actuator drive member 32, the valve member 30 or diaphragm contacts the valve seat 28 which contact opposes further axial translation of the lower portion 40 of the actuator stem 34. Therefore, as the actuator drive member 32 is turned clockwise from 70° to 90° the rotating and axially translating upper portion 42 of the actuator stem 34 continues to move toward the valve member 30, and the non-rotating and axially stationary lower portion 40 of the actuator stem is fixed in position. The controlled gap 64 thereby results in the threads 60 and 62 going through a transition portion from 70° to 90° of rotation of the actuator stem 34 where the threads 60, 62 are not in contact with each other (FIG. 4C) and the valve continues to be held closed by the indirect drive of the first force 74 that is being applied to the lower portion 40 of the actuator stem 34 by the biasing member 50. In other words, from the 70° position to at or near the 90° position, the force applied through rotation of the actuator drive member 32 overcomes the applied load that is defined or set by the biasing member 50 (the first force 74) so that the upper portion 42 of the actuator stem 34 disengages from the lower portion 40 of the actuator stem 34.

At or near the 90° position, the threads 60, 62 reengage, but now an upper surface 76 of each thread 60 of the lower portion 40 of the actuator stem 34 contacts or slides along a lower surface 78 of each thread 62 of the upper portion 42 of the actuator stem 34. As a result, as the actuator stem 34 is rotated to the fully closed 90° position, the upper portion 42 of the actuator stem 34 is directly applying a closing load or second force 80 against the lower portion 42 of the actuator stem, which second force is directly transmitted to the valve member 30 to apply a closing load on the valve member 30. Because the second force 80 is exclusively attributable to the force applied by rotation of the actuator drive member 32 to the upper portion 42 of the actuator stem34, and this second force is directly transmitted to the valve member 30 through the lower portion 40 of the actuator stem 34, we refer to this movement as a direct drive of the lower portion 40 of the actuator stem 34 as the actuator drive member 32 reaches the 90° fully closed position. It will be appreciated that the degree of over-travel can be controlled by selecting the amount of controlled backlash between the threads 60, 62. The backlash can be controlled in many ways, including selection and control of the diameter and pitch of the engaging threads 60, 62.

The direct drive portion of the actuation can be used to apply a desired closing force 80 or load as needed on the valve member 30 to provide a tightly closed valve. Because the closing force 80 is produced by the direct drive of the upper portion 42 of the actuator stem 34, and more particularly the actuator stem 34 is now acting as a single drive member, the torque needed to apply the closing force is the same as when a single direct drive actuator is used with the same thread pitch. Therefore, greater stroke for the actuator can be realized without increasing the torque needed for the closing force 80. Typically, the closing or second force 80 will be higher than the first force 74 applied by the biasing member 50. For example, the indirect drive first force of biasing member 50 may apply a load of seventy pounds on the valve member 30, whereas the direct drive second force of the actuator stem 34 might provide a closing load of one-hundred twenty pounds. These values are of course all exemplary.

We note at this point that although the exemplary embodiments illustrate use of a rotary actuator drive member 32, such is not required in all applications. For example, the over-travel feature using a controlled gap may be realized with a lever type actuator drive member or other actuator drive member design as needed to effect axial translation of the actuator stem 34.

Figure 5:
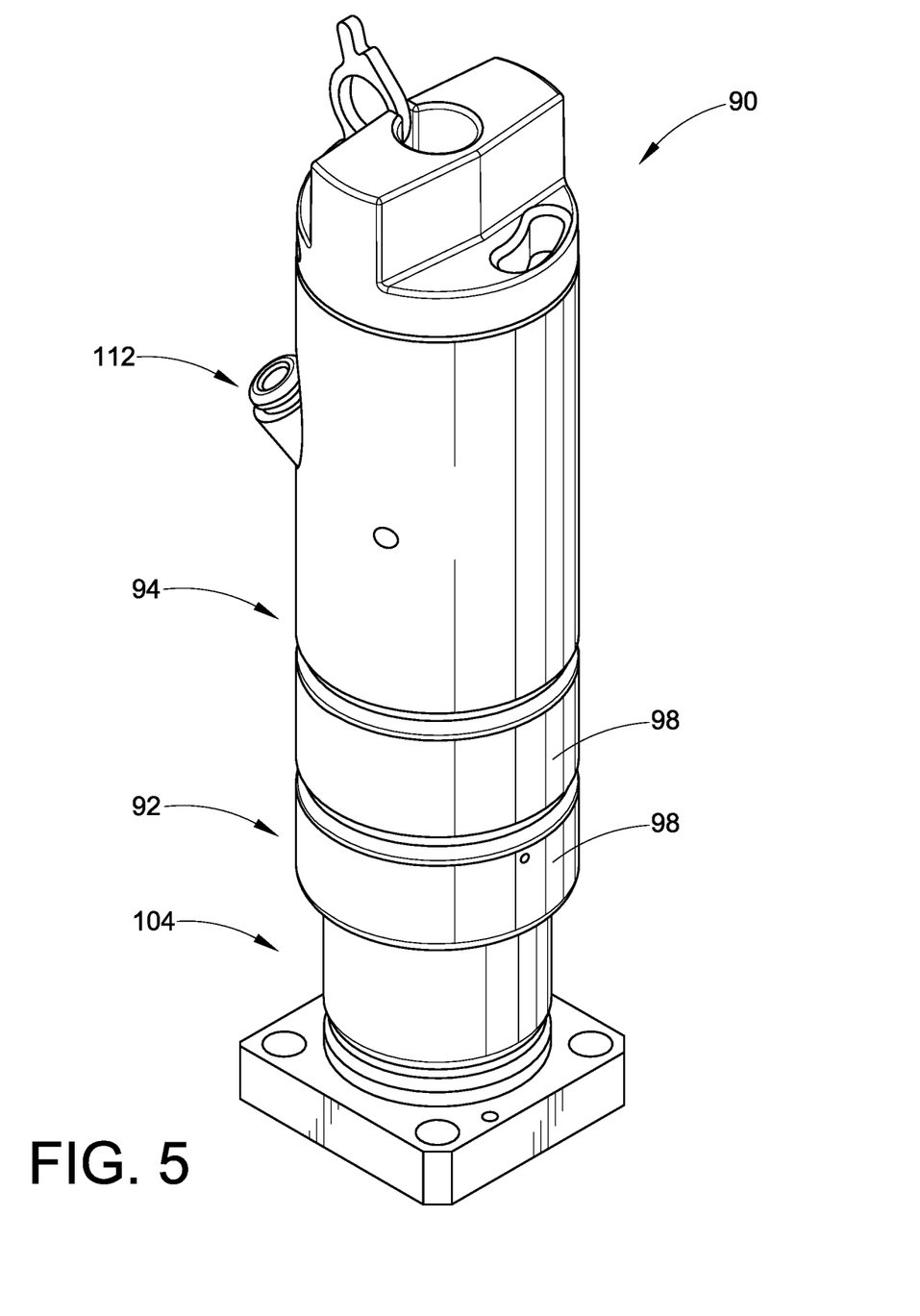
FIG. 5 is an embodiment of a hybrid actuator and valve assembly in isometric and in a valve closed condition.
Figure 6:
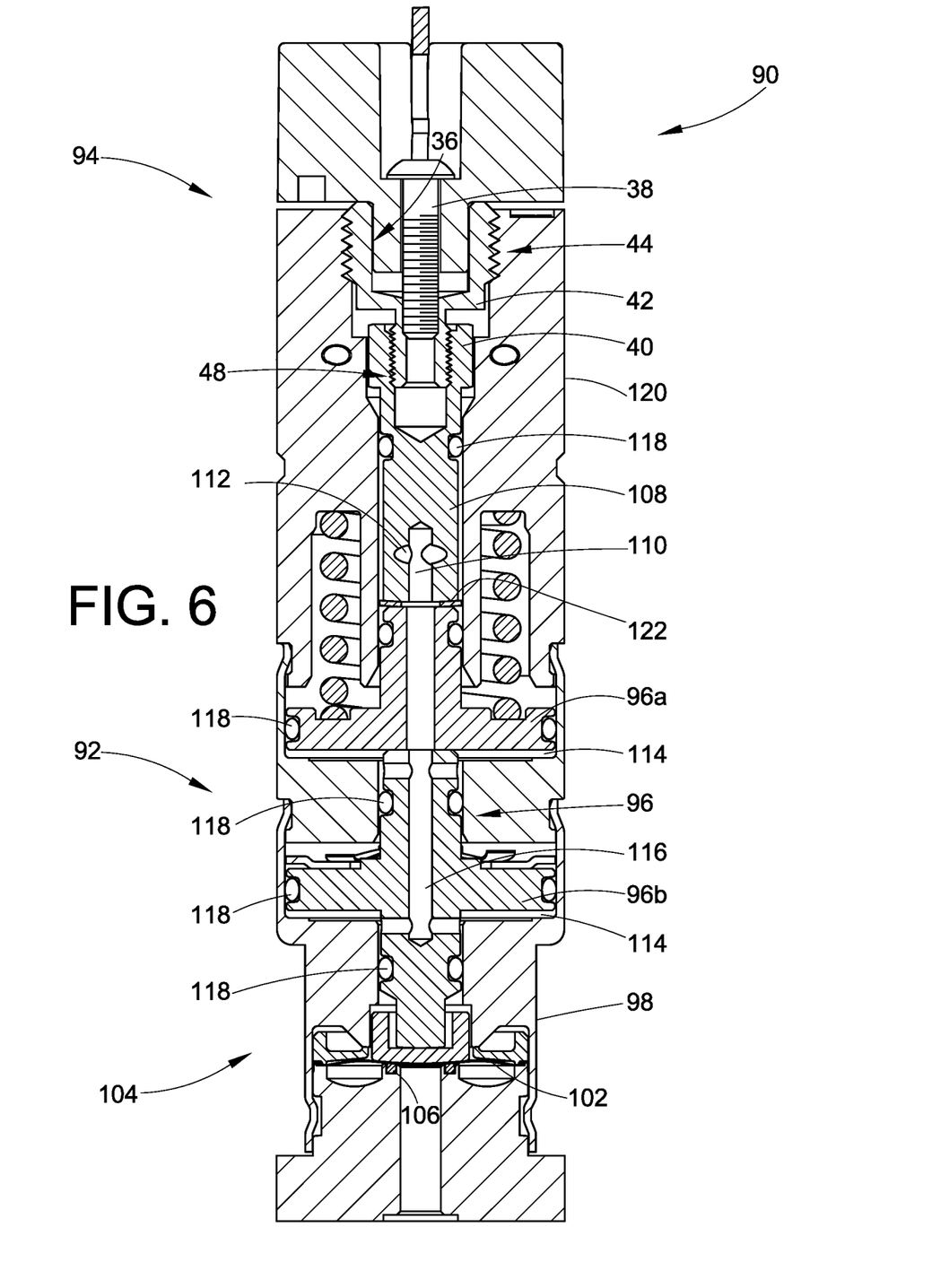
FIG. 6 is the hybrid actuator and valve assembly of FIG. 5 in longitudinal cross-section.

With reference next to FIGS. 5 and 6, we illustrate an embodiment of a hybrid actuator and valve assembly 90. A hybrid actuator includes a manual actuator function and a pneumatic actuator function. In simple terms, the hybrid actuator includes a pneumatically operated actuator assembly 92 and a manually operated actuator assembly 84 with the manually operated actuator 94 stacked on top of the pneumatically operated actuator 92. The manually operated actuator assembly 94 may be but need not be realized in a similar manner and function as the manually operated actuator 12 described hereinabove, and the same reference numerals are used for like elements. Thus, the manual actuator assembly 94 may operate with the over-travel feature and the predetermined thread backlash concept of the manually operated actuator of FIGS. 1-3 herein.

A pneumatic actuator assembly 92 commonly includes a piston assembly 96 that is disposed in an actuator housing 98. As shown, the actuator housing may be a multi-piece housing or alternatively a single piece housing. In the exemplary embodiment, two pistons 96a and 96b may be used but alternatively a single piston actuator may be used or more than two pistons may be used as needed. A spring 100 is used to urge the piston assembly 96 in a first direction that pushes the valve member 102 or diaphragm of the valve assembly 104 into sealing engagement with a valve seat 106, thereby providing a normally closed valve. The piston assembly 96 may include an actuator stem 108 that has an air passage 110 therethrough. The air passage 110 is in fluid communication with an air inlet fitting (not shown), through a housing air passage 112, that receives pressurized air from a pressurized air source (not shown). The air passage 110 communicates with a piston chambers 114 via air passages 116 in the pistons 96a and 96b. When pressurized air is supplied to the pneumatic actuator assembly 92, the air pressure overcomes the spring 100 bias and moves the piston assembly 96 against the spring 100 to a second position (not shown), which allows the valve member 102 to move to an open position away from the valve seat 106. When air pressure is removed, the spring 100 returns the piston assembly 96 to the first position (FIG. 1) and the valve is closed. O-rings 118 or other suitable seals provide pressure containment for the actuator pressurized air to move the piston assembly 96.

Although the manually operated actuator 94 may be basically the same as described hereinabove, it will be noted that the lower portion 40 of the actuator stem 34 may also provide the air passage 110 access for the pneumatically operated actuator 92. Note also that the actuator housing 120 may be extended compared to the manually operated actuator alone in order to accommodate a portion of the pneumatically operated actuator 92. And rather than the lower portion 40 of the actuator stem 34 engaging the valve member 102 or a button 58, the lower portion 40 may engage a Belleville spring 122 that also contacts the piston assembly 96. The Belleville spring 122 may be used to provide the biasing force that for the manual actuator of FIG. 2 is provided by the spring 50. Thus, the manually operated actuator 94 may be used manually to override the pneumatically operated actuator 92. For example, when the manual actuator 94 is closed it prevents the pneumatic actuator 92 from opening the valve member 102 even if pressurized air is applied to the housing air passage 112. In the event the pneumatic actuator 92 is energized and the valve member 102 is in the open position, the manual actuator 94 may be used to force the pneumatic actuator 92 to the closed position when the actuator drive member or handle 32 is rotated to the closed position. In the exemplary embodiment, the manual actuator 94 cannot open the valve unless the pneumatic actuator 92 is also energized to allow the open condition.

Figure 7:
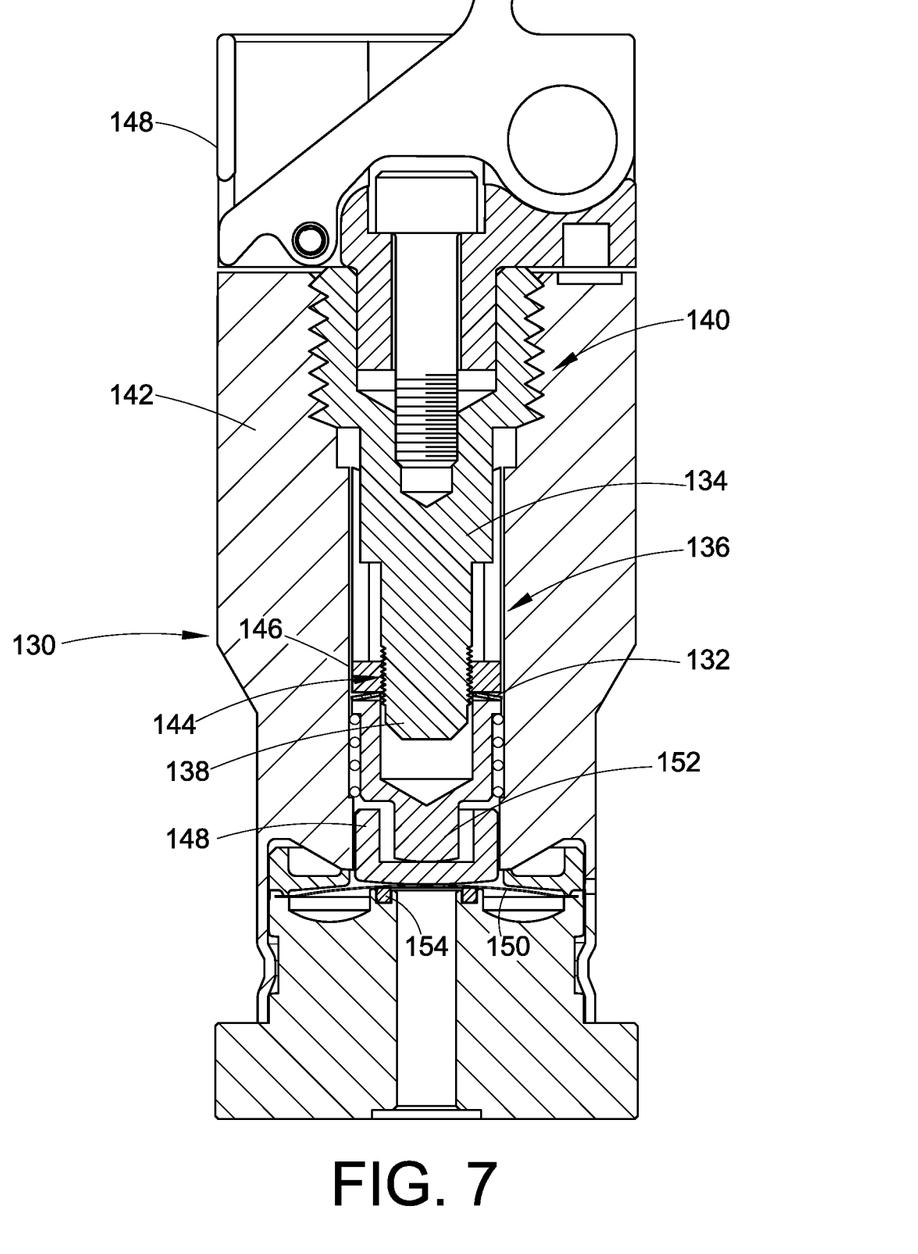
FIG. 7 is another embodiment of a dual drive manual actuator and valve assembly with over-travel.
Figure 8:
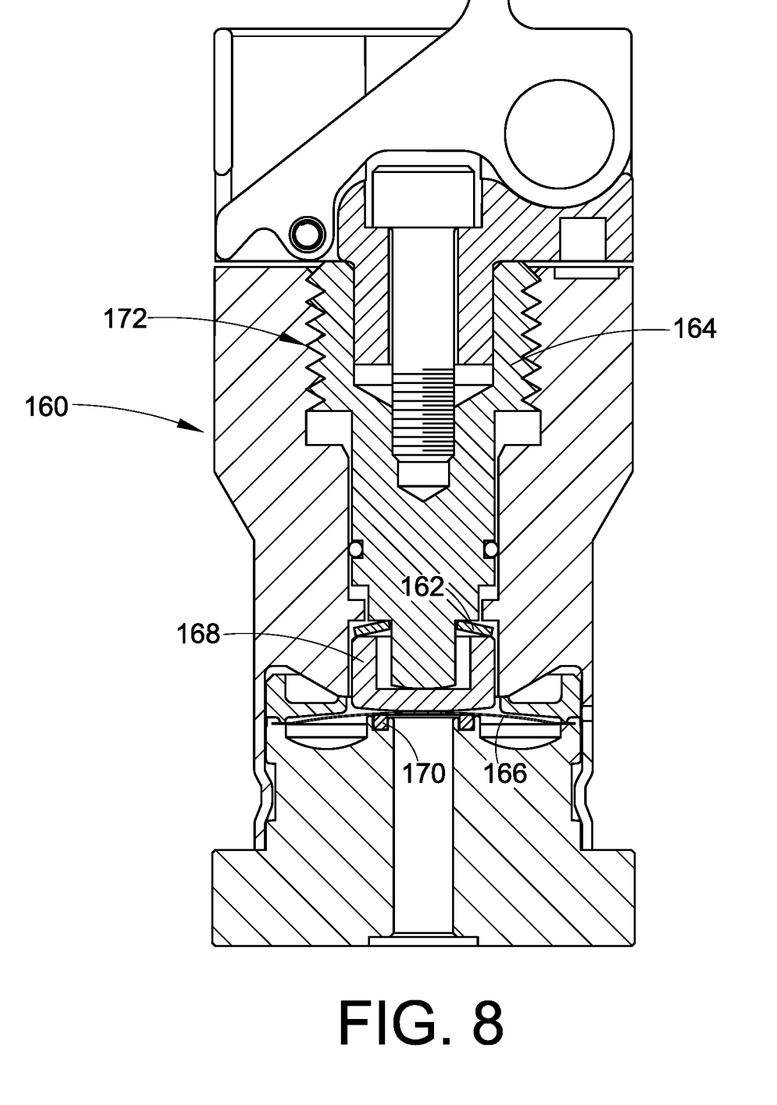
FIG. 8 is another embodiment of a dual drive manual actuator and valve assembly with over-travel.

FIGS. 7 and 8 illustrate additional alternative embodiments for a manually operated actuator. In FIG. 7 we illustrate an embodiment of a dual drive actuator 130 that uses a biasing member 132, such as a Belleville spring. In this embodiment, the Belleville spring 132 may be pre-compressed so that the Belleville spring 132 will go to a flat condition in a predetermined stroke of the upper portion 134 of the actuator stem 136 relative to a lower portion 138 of the actuator stem 136 after the valve member (150) contacts the valve seat (154). A first threaded connection 140 joins the upper portion 134 to the housing 142 and a second threaded connection 144 joins the lower portion 138 to a threaded nut 146. Note in this example that the actuator stem 136 is a single piece stem because of the alternative use of the threaded nut 146. As in the first embodiment, the first and second threaded connections 140, 144 may have different thread orientations. For example, the first threaded connection 140 may have a right hand thread orientation and the second threaded connection 144 may have a left hand thread orientation. The Belleville spring 132 is used to provide the over-travel feature, so that the second threaded connection 144 need not include a design-in thread backlash, although alternatively it may as needed. The lower portion 138 may directly contact a button 148 or a valve member 150 such as a diaphragm, or may make the contact to the valve member 150 using an intermediate piece 152. In this example, the intermediate piece 152 serves to pre-compress the spring 132 in cooperation with the threaded nut 146.

FIG. 7 shows the assembly in a valve open position. As the handle 148 is turned clockwise, the upper portion 134 moves downward as does the lower portion 138 of the actuator stem 136 under the influence of the pre-compressed Belleville spring 132, which applies a first force to the valve member 150. When the valve member 150 contacts the valve seat 154, further axial movement of the upper portion 134 will cause the Belleville spring 132 to go to a flat condition so that the upper portion 134 now provides a direct drive to apply a second force to the valve member 150. The amount of stroke that is designed into the Belleville pre-compression before the spring 132 goes to a flat condition can be used to control the amount of over-travel.

FIG. 8 illustrates a direct drive manually operated actuator 160 that includes an over-travel feature. The over-travel feature may be realized in the form of a Belleville spring or other biasing member 162 as needed. The Belleville spring may be pre-compressed as in the embodiment of FIG. 7 so that the amount of stroke that is designed into the Belleville spring pre-compression before the Belleville spring 162 goes to a flat condition can be used to control the amount of over-travel. In the embodiment of FIG. 8, the actuator 160 is conventional in design to provide a direct drive between an actuator stem 164 and the valve member 166, with an optional button 168. However, in this embodiment, the biasing member 162 may be disposed between the actuator stem 164 and the valve member 166 or optional button 168. As the direct drive actuator stem 164 moves axially toward the valve member 166, a first force is applied to the valve member 166 by operation of the pre-compressed biasing member 162. When the valve member 162 contacts the valve seat 170, there will be a predetermined stroke before the pre-compressed Belleville spring or biasing member 162 goes to a flat condition. This stroke provides the over-travel feature. After the Belleville spring goes to a flat condition, the direct drive of the actuator stem 164 applies a second closing force to the valve member 166 against the valve seat 170. Note that since this is a direct drive manually operated embodiment, there is only a single threaded connection 172 for the actuator stem 164.

Figure 9:
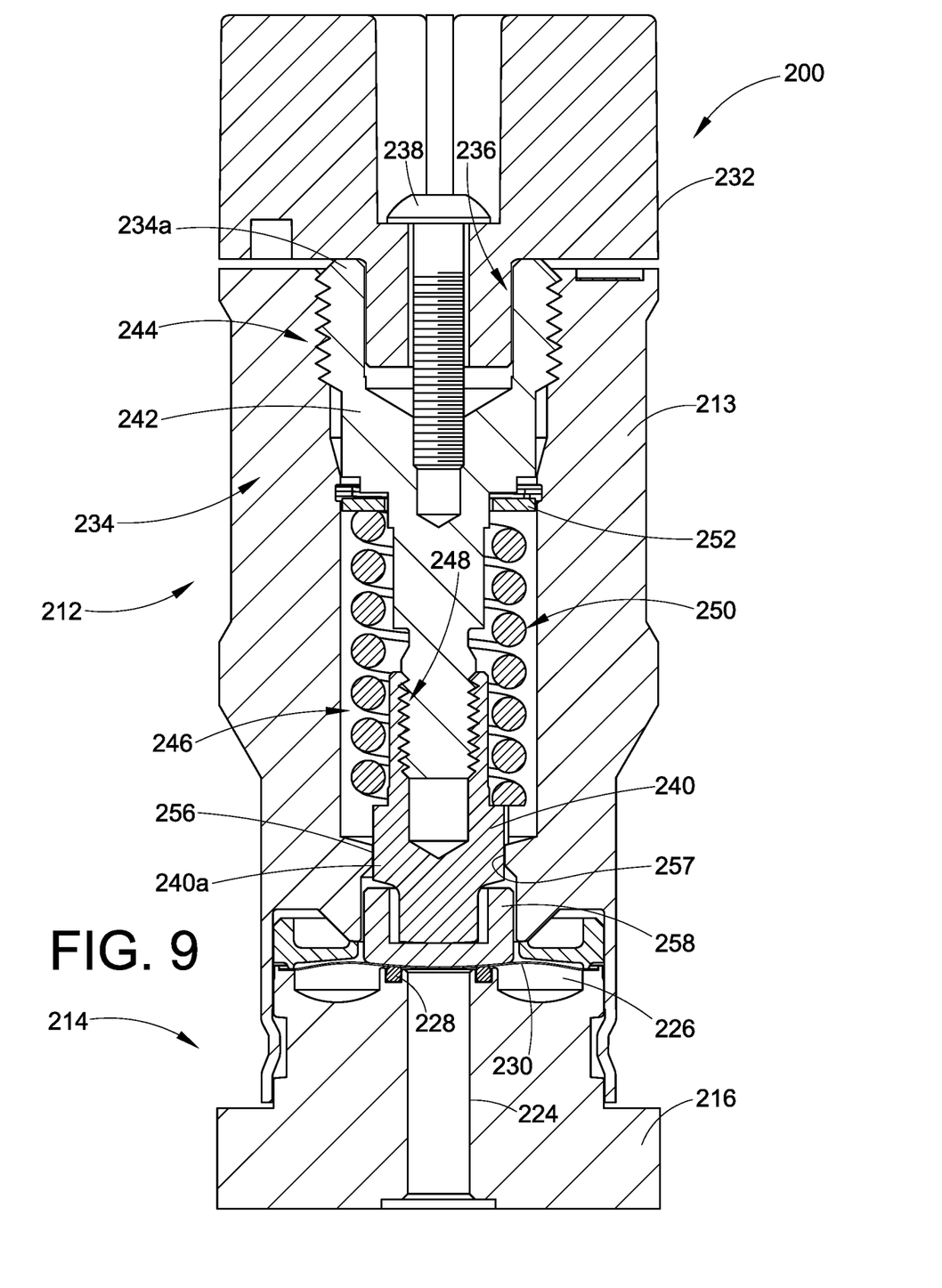
FIG. 9 is another embodiment of a manual actuator and valve assembly.

FIG. 9 illustrates an alternative embodiment of the manual actuator of FIGS. 1-3 above. The manual actuator and valve assembly 200 may operate in substantially the same manner as the embodiment of FIGS. 1-3, therefore, such description need not be repeated. We use similar reference numerals for like parts but beginning with the 200 series. Thus, 244 corresponds to the first threaded connection 44 in FIG. 2. The assembly 200 in FIG. 9 is illustrated in the valve closed position, and the assembly 200 is rotated ninety degrees from the view of FIG. 2.

By comparing FIG. 2 with FIG. 9, we have replaced an inner shoulder that present the surface 52 with a retaining ring 252 against which the spring 250 presses. The anti-rotation device 56 (FIG. 2) has been replaced with a broached hex 256 geometry for the second or lower portion 240 of the actuator stem 234. The broached hex 256 is received in a hex-shaped flange 257 of the actuator housing 213.

While various aspects and features and concepts of the inventions are described and illustrated herein as embodied in various combinations in the exemplary embodiments, these various aspects, features and concepts may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices and so on may be described herein, such descriptions are not intended to be a complete or exhaustive list of available alternative embodiments, whether presently known or later developed. Those skilled in the art may readily adopt one or more of the aspects, concepts or features of the various inventions into additional embodiments within the scope of the present inventions, even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present inventions however, such values and ranges are not to be construed in a limiting sense and are intended to be critical values or ranges only if so expressly stated. Additionally, even though some features and aspects and combinations thereof may be described or illustrated herein as having a specific form, fit, function, arrangement or method, such description is not intended to suggest that such descriptions or illustrated arrangements are required or necessary unless so expressly stated. Those skilled in the art will readily appreciate additional and alternative form, function, arrangement or methods that are either known or later developed as substitute or alternatives for the embodiments and inventions described herein.

The inventions have been described with reference to the exemplary embodiments. Modifications and alterations will occur to others upon a reading and understanding of this specification and drawings. It is intended to include all such modifications and alterations insofar as they come within the scope of the appended claims or the equivalents thereof.

We claim:

1. A manually actuated valve assembly comprising:
   a valve body defining a flow passage and carrying a valve seat;
   a valve member assembled with the valve body to seal against the valve seat in a closed position and to permit fluid flow past the valve seat in an open position;
   an actuator housing assembled with the valve body;
   an actuator stem having an upper stem portion coupled with a lower stem portion by a coupling, the upper stem portion including an upper threaded end threadably assembled with the actuator housing, the upper stem portion being threadably adjustable with respect to the actuator housing for axial movement of the actuator stem between an actuator stem first position that corresponds to said open position and an actuator stem second position that corresponds to said closed position;
   an actuator drive member coupled to said upper stem portion and rotatable between a first drive member position and a second drive member position to move said actuator stem between said actuator stem first position and said actuator stem second position;
   a biasing spring disposed in the actuator housing, wherein the biasing spring engages the lower stem portion of the actuator stem to bias the lower stem portion toward the valve seat;
   wherein said actuator drive member is rotatable between a first stop position corresponding to a fully open valve position, and a second stop position corresponding to a fully closed valve position, wherein the coupling between the upper stem portion and the lower stem portion is configured to provide an over-travel condition between said actuator drive member and said actuator stem configured to provide a closed valve condition at a predetermined rotational position of the actuator drive member that is offset from the second stop position;
   wherein when the actuator drive member is in the predetermined rotational position, a first closing force is applied to the lower stem portion exclusively by the biasing spring, and when the actuator drive member is in the second stop position, a second closing force is applied to the lower stem portion by the upper stem portion; and
   wherein the upper stem portion comprises a lower end portion have a diameter smaller than a diameter of the upper threaded end, the lower end portion extending through an opening in a spring bearing portion of the actuator housing and through the biasing spring, with the biasing spring having a diameter smaller than the diameter of the upper threaded end.

2. The manually actuated valve assembly of claim 1, wherein the biasing spring diameter is larger than an outer diameter of the lower stem portion.

3. The manually actuated valve assembly of claim 1, wherein the spring bearing portion of the actuator housing comprises a retaining ring secured with a central bore of the actuator housing.

4. The manually actuated valve assembly of claim 1, wherein the actuator drive member includes a splined projection received in a splined recess in the upper threaded end of the upper stem portion for axial movement of the upper stem portion with respect to the actuator drive member.

5. The manually actuated valve assembly of claim 1, wherein the coupling comprises a lower threaded end of the upper stem portion and an upper threaded end of the lower stem portion.

6. The manually actuated valve assembly of claim 1, wherein the biasing spring extends over the coupling to surround the coupling.

7. The manually actuated valve assembly of claim 1, wherein said actuator drive member is rotatable one quarter turn between the first stop position and the second stop position.

8. The manually actuated valve assembly of claim 7, wherein the coupling is configured to provide a closed valve condition at a rotational position of the actuator drive member that is 20 degrees from the second stop position.

9. The manually actuated valve assembly of claim 7, wherein the actuator stem is configured to provide a fully open valve condition at a rotational position of the actuator drive member that is 20 degrees from the first stop position.

10. The manually actuated valve assembly of claim 1, wherein said valve member comprises a diaphragm.

11. The manually actuated valve assembly of claim 10, further comprising a button disposed between the diaphragm and a lower end of the lower stem portion.

12. The manually actuated valve assembly of claim 1, wherein said upper stem portion is threadably coupled to said actuator housing with a first thread orientation and said coupling comprises a second thread orientation that is opposite said first thread orientation.

13. The manually actuated valve assembly of claim 1, wherein the actuator stem is configured to provide a fully open valve condition at a rotational position of the actuator drive member that is a predetermined angle from the first stop position.

14. The manually actuated valve assembly of claim 7, A manually actuated valve assembly comprising:
  a valve body defining a flow passage and carrying a valve seat
  a valve member assembled with the valve body to seal against the valve seat in a closed position and to permit fluid flow past the valve seat in an open position;
  an actuator housing assembled with the valve body;
  an actuator stem having an upper stem portion coupled with a lower stem portion by a coupling, the upper stem portion including an upper threaded end threadably assembled with the actuator housing, the upper stem portion being threadably adjustable with respect to the actuator housing for axial movement of the actuator stem between an actuator stem first position that corresponds to said open position and an actuator stem second position that corresponds to said closed position;
  an actuator drive member coupled to said upper stem portion and rotatable between a first drive member position and a second drive member position to move said actuator stem between said actuator stem first position and said actuator stem second position;
  a biasing spring disposed in the actuator housing, wherein the biasing spring engages the lower stem portion of the actuator stem to bias the lower stem portion toward the valve seat
  wherein said actuator drive member is rotatable between a first stop position corresponding to a fully open valve position, and a second stop position corresponding to a fully closed valve position, wherein the coupling between the upper stem portion and the lower stem portion is configured to provide an over-travel condition between said actuator drive member and said actuator stem configured to provide a closed valve condition at a predetermined rotational position of the actuator drive member that is offset from the second stop position;
  wherein when the actuator drive member is in the predetermined rotational position, a first closing force is applied to the lower stem portion exclusively by the biasing spring, and when the actuator drive member is in the second stop position, a second closing force is applied to the lower stem portion by the upper stem portion;
  the manually actuated valve assembly further comprising an anti-rotation device that prevents the lower stem portion from rotating when the actuator stem is axially moved between the actuator stem first position and the actuator stem second position, wherein the anti-rotation device comprises a hex portion of the lower stem portion received in a hex-shaped opening in the actuator housing.

15. A manually actuated valve assembly comprising:
  a valve body defining a flow passage and carrying a valve seat
  a valve member assembled with the valve body to seal against the valve seat in a closed position and to permit fluid flow past the valve seat in an open position;
  an actuator housing assembled with the valve body;
  an actuator stem having an upper stem portion coupled with a lower stem portion by a coupling, the upper stem portion including an upper threaded end threadably assembled with the actuator housing, the upper stem portion being threadably adjustable with respect to the actuator housing for axial movement of the actuator stem between an actuator stem first position that corresponds to said open position and an actuator stem second position that corresponds to said closed position;
  an actuator drive member coupled to said upper stem portion and rotatable between a first drive member position and a second drive member position to move said actuator stem between said actuator stem first position and said actuator stem second position;
  a biasing spring disposed in the actuator housing, wherein the biasing spring engages the lower stem portion of the actuator stem to bias the lower stem portion toward the valve seat
  wherein said actuator drive member is rotatable between a first stop position corresponding to a fully open valve position, and a second stop position corresponding to a fully closed valve position, wherein the coupling between the upper stem portion and the lower stem portion is configured to provide an over-travel condition between said actuator drive member and said actuator stem configured to provide a closed valve condition at a predetermined rotational position of the actuator drive member that is offset from the second stop position;
  wherein when the actuator drive member is in the predetermined rotational position, a first closing force is applied to the lower stem portion exclusively by the biasing spring, and when the actuator drive member is in the second stop position, a second closing force is applied to the lower stem portion by the upper stem portion; and
  wherein the actuator drive member is secured to the upper stem portion by a bolt.

* * * * *

UNITED STATES PATENT AND TRADEMARK OFFICE
CERTIFICATE OF CORRECTION

PATENT NO. : 10,690,259 B2
APPLICATION NO. : 16/581830
DATED : June 23, 2020
INVENTOR(S) : William H. Glime, III et al.

Page 1 of 1

It is certified that error appears in the above-identified patent and that said Letters Patent is hereby corrected as shown below:

In the Claims

Column 13, Lines 31 please delete the following:
"The manually actuated valve assembly of claim 7,"

Signed and Sealed this
Twenty-fifth Day of August, 2020

Andrei Iancu
*Director of the United States Patent and Trademark Office*